(12) United States Patent
Lucht

(10) Patent No.: US 9,920,716 B2
(45) Date of Patent: Mar. 20, 2018

(54) METHOD AND SYSTEM FOR PREDICTIVE EMISSION MAINTENANCE OF AN ENGINE

(71) Applicant: THERMO KING CORPORATION, Minneapolis, MN (US)

(72) Inventor: Erich A. Lucht, Arden Hills, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 37 days.

(21) Appl. No.: 15/225,327

(22) Filed: Aug. 1, 2016

(65) Prior Publication Data

US 2017/0030307 A1    Feb. 2, 2017

Related U.S. Application Data

(60) Provisional application No. 62/199,337, filed on Jul. 31, 2015.

(51) Int. Cl.

| | |
|---|---|
| F02M 26/49 | (2016.01) |
| F02M 26/48 | (2016.01) |
| F02D 41/00 | (2006.01) |
| F02D 41/06 | (2006.01) |
| F01N 3/021 | (2006.01) |
| F01N 3/10 | (2006.01) |
| F02M 26/22 | (2016.01) |
| F02M 55/02 | (2006.01) |
| G01M 15/04 | (2006.01) |
| G07C 5/00 | (2006.01) |

(Continued)

(52) U.S. Cl.
CPC .............. *F02M 26/49* (2016.02); *F01N 3/021* (2013.01); *F01N 3/103* (2013.01); *F02D 41/0055* (2013.01); *F02D 41/062* (2013.01); *F02M 26/22* (2016.02); *F02M 26/48* (2016.02); *F02M 55/025* (2013.01); *G01M 15/042* (2013.01); *G07C 5/006* (2013.01); *G07C 5/0808* (2013.01); *G07C 5/0816* (2013.01); *H04L 51/24* (2013.01); *H04W 4/14* (2013.01); *F02D 2041/228* (2013.01); *Y02T 10/47* (2013.01)

(58) Field of Classification Search
CPC ........ F02M 26/49; F02M 26/22; F02M 26/48; F02M 55/025; G07C 5/0816; G07C 5/0808; G07C 5/006; F02D 41/062; F02D 41/0055; F02D 2041/228; H04W 4/14; H04L 51/24; F01N 3/021; F01N 3/103; G01M 15/042; Y02T 10/47
USPC ........................................................ 701/31.9
See application file for complete search history.

(56) References Cited

U.S. PATENT DOCUMENTS

| 5,617,833 A | 4/1997 | Tomisawa et al. |
| 5,621,167 A | 4/1997 | Fang-Cheng |

(Continued)

*Primary Examiner* — Brian P Sweeney
(74) *Attorney, Agent, or Firm* — Hamre, Schumann, Mueller & Larson, P.C.

(57) ABSTRACT

Methods and systems for predictive emission maintenance of an engine. In one embodiment, a method for predictive emission maintenance of an engine is provided. The method can include a controller obtaining operational status information of the engine upon startup of a transport refrigeration unit (TRU) or a TRU generator set (GenSet). The method also includes the controller predicting engine emission maintenance based on the operational status information. Also, the method includes the controller providing an advanced notification warning based on whether the controller predicts engine emission maintenance.

18 Claims, 2 Drawing Sheets

(51) Int. Cl.
  *G07C 5/08*  (2006.01)
  *H04W 4/14*  (2009.01)
  *H04L 12/58* (2006.01)
  *F02D 41/22* (2006.01)

(56) References Cited

U.S. PATENT DOCUMENTS

| | | |
|---|---|---|
| 6,024,075 A | 2/2000 | Bidner et al. |
| 6,460,522 B1 | 10/2002 | Rimnac |
| 6,687,601 B2 | 2/2004 | Bale et al. |
| 6,837,226 B2 | 1/2005 | Wang et al. |
| 7,715,975 B2 | 5/2010 | Yamaoka et al. |
| 8,225,684 B2 | 7/2012 | Kondo et al. |
| 8,649,961 B2 | 2/2014 | Hawkins et al. |
| 8,905,009 B2 | 12/2014 | Moritani et al. |
| 9,008,854 B2 | 4/2015 | Breed |
| 2013/0104859 A1 | 5/2013 | Miyazaki et al. |
| 2015/0314670 A1* | 11/2015 | Lucht .................. B60P 3/20 62/115 |

\* cited by examiner

METHOD AND SYSTEM FOR PREDICTIVE EMISSION MAINTENANCE OF AN ENGINE

FIELD

The embodiments disclosed herein relate generally to an engine. More particularly, the embodiments relate to a method and system for predictive emission maintenance of an engine.

BACKGROUND

A transport refrigeration unit (TRU) or TRU generator set (GenSet) are typically required to run autonomously, unattended and uninterrupted for an extended period of time. Conventionally, the TRU or TRU GenSet includes a prime mover (e.g., a diesel engine) that generates mechanical power for powering components of the TRU (e.g., a compressor, fan(s), a controller, etc.) that allow the TRU to provide environmental control within a transport unit. In some instances, the prime mover may be required to operate without operator intervention for e.g., up to two weeks at a time. In many instances, the prime mover is required to meet and maintain emission standards (e.g., Environmental Protection Agency (EPA) Tier 4 emission standards).

SUMMARY

The embodiments disclosed herein relate generally to an engine. More particularly, the embodiments relate to a method and system for predictive emission maintenance of an engine.

In particular, the embodiments described herein can provide an advanced notification that engine maintenance is required in order to avoid TRU down-time, avoid unnecessary expense, and to improve profitable utilization of the TRU or TRU GenSet.

In some embodiments, the prime mover of the TRU or TRU GenSet is a common rail diesel internal combustion engine.

In some embodiments, each time a TRU or TRU GenSet is switched to an ON state to operate, a controller can confirm the operational status of one or more engine sensors and/or emission reduction components such as an EGR valve component. If the initial position of a valve of the EGR valve component is found to be out of range, operation of the engine can become limited to a regulatory specified minimal output (e.g., 75% maximum available torque of a low speed engine mode). The controller can track the initial valve position beginning with a new engine up to the point that EGR valve component is required due to the accumulation of soot, gas deposits, etc., between the valve of the EGR valve component and a seat of the EGR valve component. Tracking the change in initial valve position of the EGR valve component can allow the pending maintenance (e.g., soot and deposit cleaning) to be predicted so that uninterrupted engine operation can be performed. In some embodiments, the controller can track a position of the valve of the EGR valve component that is not the initial valve position. That is, the controller can track a position of the valve at other times other than when the TRU or TRU GenSet is switched to an ON state.

In one embodiment, a method for predictive emission maintenance of an engine is provided. The method can include a controller obtaining operational status information of the engine upon startup of a transport refrigeration unit (TRU) or a TRU generator set (GenSet). The method also includes the controller predicting engine emission maintenance based on the operational status information. Also, the method includes the controller providing an advanced notification warning based on whether the controller predicts engine emission maintenance.

In another embodiment, an emission reduction system for an engine is provided. The system can include an emission reduction component, a sensor and a controller. The emission reduction component can be configured to reduce emissions of the engine. The sensor can be configured to monitor an operational status of the emission reduction component and can be configured to send operational status information of the emission reduction component to the controller. The controller can be configured to receive the operational status information, can be configured to predict engine emission maintenance based on the operational status information, and can be configured to generate an advanced notification warning to a user based on whether the controller predicts engine emission maintenance.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments disclosed herein relate generally to an engine. More particularly, the embodiments relate to a method and system for predictive emission maintenance of an engine. In particular, the embodiments described herein can predict when engine emission maintenance is required and provide an advanced notification that engine maintenance is required in order to avoid TRU or TRU GenSet down-time, avoid unnecessary expense, and to improve profitable utilization of the TRU or TRU GenSet.

In some embodiments, the embodiments described herein can predict when engine emission maintenance is required even when periodic engine maintenance service has not been conducted or periodic engine maintenance has been ignored.

While the embodiments described below are directed to an engine that is a common rail diesel internal combustion engine, it will be appreciated that the embodiments described herein can be used in any type of internal combustion engine that include similar emission systems.

Figure 1:
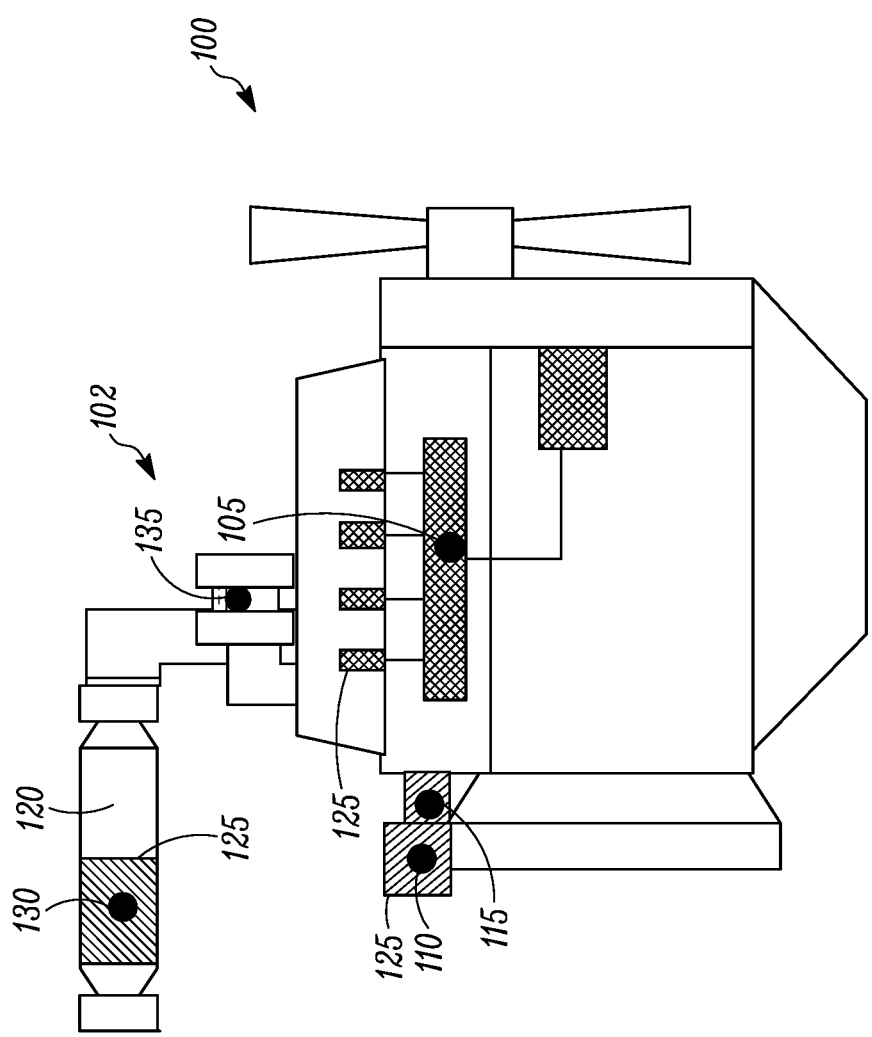
FIG. 1 illustrates an engine that can be used in a TRU or TRU GenSet, according to one embodiment.

FIG. 1 illustrates an engine 100 that can be used in a TRU or TRU GenSet, according to one embodiment. The engine 100 is a common rail diesel engine that includes an emissions reduction system 102. The emissions reduction system 102 includes a common rail injection (CR) manifold 105, an exhaust gas recirculation (EGR) valve component 110, an EGR cooler 115 positioned upstream of the EGR valve component 110, a diesel oxidation catalyst (DOC) component 120, a diesel particulate filter (DPF) 130, and a turbo charger 135. In some embodiments, the emissions reduction system 102 can be configured to meet set emission standards (e.g., EPA Tier 4 Emission Standards).

The EGR valve component 110 can include a valve (not shown), a seat (not shown) and an actuator (not shown). The actuator can be configured to move the valve between a fully open position and a fully closed position. It will be appreciated that soot and/or gas deposits can buildup between the valve and the seat during operation of the engine. This buildup can reduce the ability of the engine to meet and maintain emission requirements and standards. The EGR cooler 115 can include a duct, a plenum, a collector, etc.

The CR manifold 105 is configured to reduce nitrogen oxide(s) ($NO_x$), excess hydrocarbon and particulate matter of the engine 100. In some embodiments, the CR manifold 105 can be configured to reduce greenhouse gases, including, for example, carbon dioxide. The EGR valve component 110 is configured to reduce nitrogen oxide(s) ($NO_x$), but can also increase particulate matter in the engine 100. The DOC component 120 is configured to reduce unburned hydrocarbons and can also reduce particulate matter in the engine 100. The DPF 130 is configured to reduce particulate matter in the engine 100. The turbo charger 135 is configured to reduce particulate matter, nitrogen oxide(s) ($NO_x$) and carbon dioxide.

It will be appreciated that in different embodiments, components (such as, for example, the DOC 120, DPF 130, the turbo charger 135, etc.) of the emissions reduction system 102 may or may not be included.

The engine 100 also includes a plurality of sensors 125 that are configured to provide operation status information of various components of the engine and the emissions reduction system 102 to a controller (not shown) such as an engine control unit (ECU) of the engine 100, a TRU controller, a TRU GenSet controller, etc. In some embodiments, one of the sensors 125 can be an EGR actuator (not shown) that is part of the EGR valve component 110 and can be configured to open and close a valve of the EGR valve component 110 and to monitor a position of the valve of the EGR valve component 110 (e.g., an initial position of a valve of the EGR valve component 110 upon startup of the TRU or TRU GenSet). In some embodiments, the actuator can include a linear motor to open and close the valve of the EGR valve component 110.

Over time, components of the emission reduction system 102 and the engine 100 itself can collect soot, gas deposits (due to condensation of e.g., $NO_x$ gas, $CO_2$ gas, etc.) and other particulate matter in an effort to reduce emissions of the engine 100. This can, over time, result in the engine 100 becoming unable to maintain emission standards and/or requirements (e.g., EPA Tier 4 Emission Standards). This can include buildup of soot, gas deposits, etc. collecting between a valve of the EGR valve component and a seat of the EGR valve component. A TRU or TRU GenSet found to be operating with an engine that is noncompliant with emission standards and/or requirements can lead to loss of a cargo load, regulatory fines and unnecessary downtime while the engine undergoes maintenance. Upon maintenance of the engine 100 and the components of the emission reduction system 102, the engine 100 can again become compliant with emission standards and/or requirements. The embodiments described herein can prevent non-compliant operation of the engine 100 due to missing emissions standards and/or requirements which can stop the engine 100 and lose temperature control of the cargo load.

Figure 2:
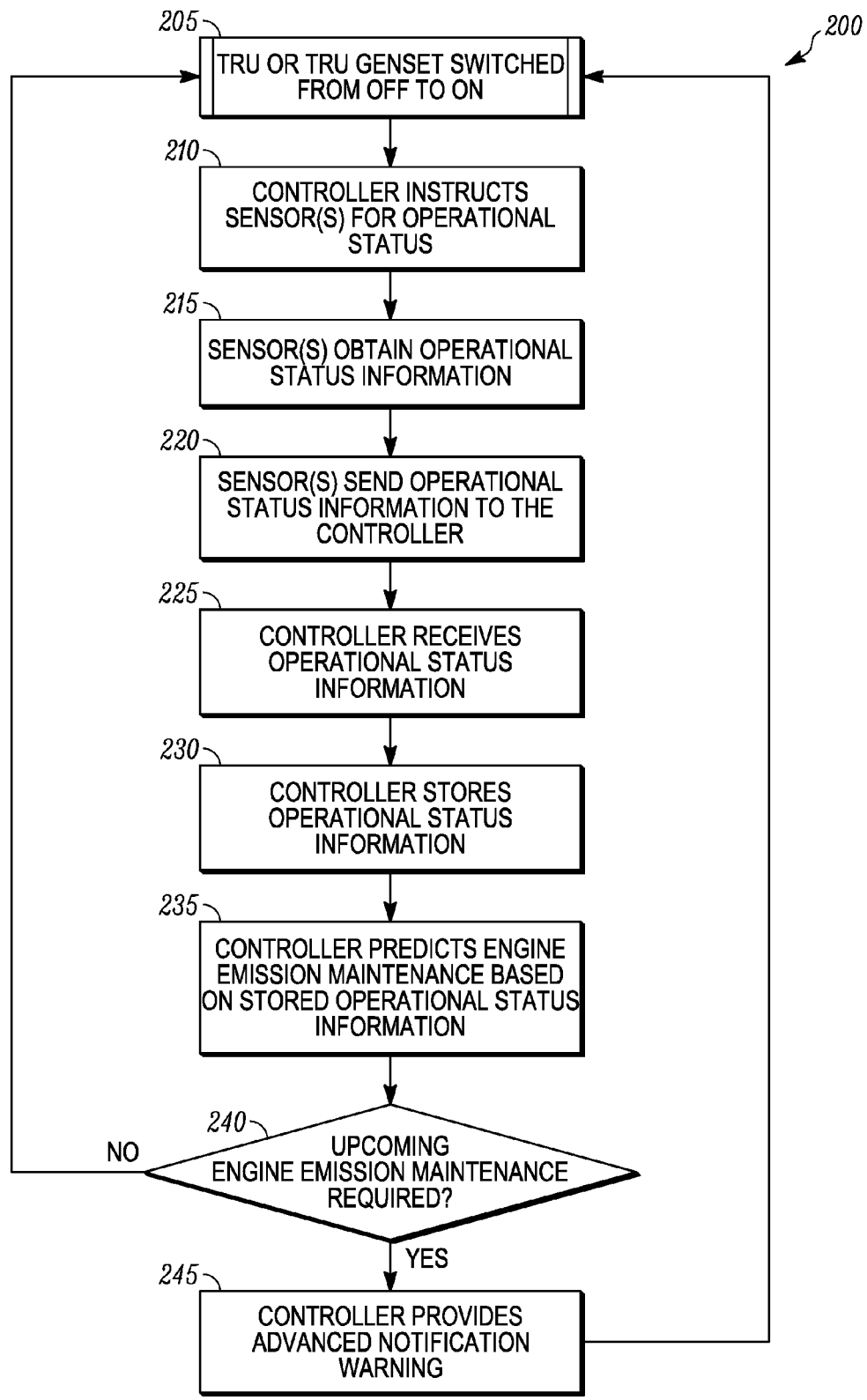
FIG. 2 is a flow chart for a method for predictive emission maintenance of an engine, according to one embodiment.

FIG. 2 is a flow chart for a method 200 for predictive emission maintenance of an engine (such as the engine 100 shown in FIG. 1) with an emission reduction system (such as the emission reduction system 102 shown in FIG. 2), according to one embodiment.

The method 200 begins upon the TRU or TRU GenSet switching from an OFF state to an ON state in order to begin operation (205). Upon the TRU or TRU GenSet powering into the ON state, a controller (e.g., an ECU, a TRU controller, a TRU GenSet controller, etc.) is configured to instruct one or more sensors (e.g., the sensors 125 shown in FIG. 1) to provide operational status of the engine including, for example, one or more components (e.g., the CR manifold 105, the EGR valve component 110, the EGR cooler 115, the DOC component 120, the DPF 130, the turbo charger 135, etc.) of an emission reduction system (e.g., the emission reduction system 102) (210).

At 215, the one or more sensors obtain operational status information from the engine including one or more components of the emission reduction system. This can include an actuator of the EGR valve component sending initial valve position of the valve with respect to the seat of the EGR valve component. The initial valve position is a position of the valve with respect to the seat of the EGR valve component upon the TRU or TRU GenSet switching from the OFF state to the ON state. At 220, the one or more sensors send the operation status information (including, for example, the initial valve position of the valve of the EGR valve component) to the controller. The controller receives the operational status information (225) and stores the operational status information in a memory storage portion of the controller (230).

At 235, the controller is configured to predict whether engine emission maintenance is required based on the stored operational status information. In some embodiments, this can include the controller evaluating rate of change of the initial valve position of the valve of the EGR valve component from, for example, a time when maintenance and/or cleaning of the engine was last completed up through the present time. Based on the rate of change of the initial valve position, the controller can predict when the engine will no longer meet emission requirements or standards. For example, once the rate of change of the initial valve position exceeds a rate of change threshold, the controller can determine whether the engine will require maintenance and/or cleaning. In some embodiments, this can include the controller evaluating the current initial valve position and predicting when the engine will no longer meet emission requirements or standards based on whether the current initial valve position exceeds a valve position threshold. The predictive threshold (e.g., the rate of change threshold, the valve position threshold, etc.) can be determined based on engine simulation testing, engine bench testing, field testing etc. The predictive threshold can be set such that the engine can operate and meet emission requirements and standards, for example, for a certain number of trips (e.g., between 1-3 trips) without requiring maintenance. The predictive threshold can also be set such that a derated operating mode of the engine due to a non-compliant condition is prevented.

At 240, if the controller predicts that engine emission maintenance is required (e.g., the predictive threshold is exceeded), the method 200 proceeds to 245. If the controller predicts that engine emission maintenance is not required (e.g., the predictive threshold is not exceeded), the method 200 proceeds back to 205 and waits for the TRU or TRU GenSet to switch from an OFF state to an ON state. At 245, the controller is configured to provide an advanced notification warning that engine maintenance will be required in order to meet and maintain emission requirements and standards. The advanced notification warning can be provided, for example, via a LED notification on the TRU or TRU GenSet, a SMS message, an email notification, etc. letting the operator, the customer, etc. that engine maintenance is required. Accordingly, TRU or TRU GenSet downtime and unnecessary expense can be avoided and profitable utilization of the TRU or TRU GenSet can be improved.

Aspects

It will be appreciated that any features of aspects 1-18 can be combined.

Aspect 1. A method for predictive emission maintenance of a common rail diesel engine having an emissions reduction system that includes an exhaust gas recirculation (EGR) valve component, the method comprising:

a controller obtaining an initial valve position of a valve of the EGR valve component with respect to a seat of the EGR valve component upon startup of a transport refrigeration unit (TRU) or a TRU generator set (GenSet);

the controller predicting engine emission maintenance based on the initial valve position of the valve of the EGR valve component;

the controller providing an advanced notification warning based on whether the controller predicts engine emission maintenance.

Aspect 2. The method of aspect 1, further comprising the controller evaluating a rate of change of the initial valve position of the valve of the EGR valve component over a time period from when maintenance and/or cleaning of the common rail diesel engine was last completed up through the controller obtaining the initial valve position of the valve.

Aspect 3. The method of aspect 2, wherein the controller predicting engine emission maintenance based on the initial valve position of the valve of the EGR valve component includes comparing the rate of change of the initial valve position to a rate of change threshold.

Aspect 4. The method of aspect 3, wherein the rate of change threshold is determined based on at least one of engine simulation testing, engine bench testing, and field testing.

Aspect 5. The method of any one of aspects 1-4, wherein the controller predicting engine emission maintenance based on the initial valve position of the valve of the EGR valve component includes comparing the initial valve position of the valve of the EGR valve component to a valve position threshold.

Aspect 6. The method of aspect 5, wherein the valve position threshold is determined based on at least one of engine simulation testing, engine bench testing, and field testing. Aspect 7. The method of any one of aspects 1-6, wherein the controller providing the advanced notification warning based on whether the controller predicts engine emission maintenance includes providing notification of emissions maintenance prior to the common rail diesel engine failing emissions standards and/or requirements.

Aspect 8. The method of any one of aspects 1-7, wherein the controller providing the advanced notification warning based on whether the controller predicts engine emission maintenance includes providing at least one of: a display notification on the TRU or GenSet; a short message service (SMS) notification to a user; and an email notification to the user.

Aspect 9. The method of any one of aspects 1-8, further comprising an actuator of the EGR valve component sending the initial valve position of the valve of the EGR valve component to the controller.

Aspect 10. An emission reduction system for a common rail diesel engine comprising:

an exhaust gas recirculation (EGR) valve component reducing emissions of the common rail diesel engine, the EGR valve component including a valve and a seat;

a sensor configured to monitor an initial valve position of the valve of the EGR valve component with respect to the seat of the EGR valve component upon startup of a transport refrigeration unit (TRU) or a TRU generator set (GenSet); and a controller programmed to receive the initial valve position, programmed to predict engine emission maintenance based on the initial valve position, and programmed to generate and provide an advanced notification warning to a user when the controller predicts engine emission maintenance.

Aspect 11. The emission reduction system of aspect 10, wherein the controller is programmed to evaluate a rate of change of the initial valve position of the valve of the EGR valve component over a time period from when maintenance and/or cleaning of the common rail diesel engine was last completed up through the controller obtaining the initial valve position of the valve.

Aspect 12. The emission reduction system of aspect 11, wherein the controller is programmed to predict engine emission maintenance based on the initial valve position of the valve of the EGR valve component includes the controller being programmed to compare the rate of change of the initial valve position to a rate of change threshold.

Aspect 13. The emission reduction system of aspect 12, wherein the rate of change threshold is based on at least one of engine simulation testing, engine bench testing, and field testing. Aspect 14. The emission reduction system of any one of aspects 10-13, wherein the controller is programmed to predict engine emission maintenance based on the initial valve position of the valve of the EGR valve component includes the controller being programmed to compare the initial valve position of the valve of the EGR valve component to a valve position threshold. Aspect 15. The emission reduction system of aspect 14, wherein the valve position threshold is based on at least one of engine simulation testing, engine bench testing, and field testing.

Aspect 16. The emission reduction system of any one of aspects 10-15, wherein the controller is programmed to provide the advanced notification warning based on whether the controller predicts engine emission maintenance includes the controller HSML Ref. No. 20420.0097USU1 being programmed to provide notification of emissions maintenance prior to the common rail diesel engine failing emissions standards and/or requirements.

Aspect 17. The emission reduction system of any one of aspects 10-16, wherein the controller is programmed to provide the advanced notification warning based on whether the controller predicts engine emission maintenance includes the controller being programmed to provide at least one of: a display notification on the TRU or GenSet; a short message service (SMS) notification to a user; and an email notification to the user.

Aspect 18. The emission reduction system of any one of aspects 10-17, wherein the EGR valve component includes an actuator, the actuator configured to send the initial valve position of the valve of the EGR valve component to the controller.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method for predictive emission maintenance of a common rail diesel engine having an emissions reduction system that includes an exhaust gas recirculation (EGR) valve component, the method comprising:
a controller obtaining an initial valve position of a valve of the EGR valve component with respect to a seat of the EGR valve component upon startup of a transport refrigeration unit (TRU) or a TRU generator set (GenSet);
the controller predicting engine emission maintenance based on the initial valve position of the valve of the EGR valve component;
the controller providing an advanced notification warning based on whether the controller predicts engine emission maintenance.

2. The method of claim 1, further comprising the controller evaluating a rate of change of the initial valve position of the valve of the EGR valve component over a time period from when maintenance and/or cleaning of the common rail diesel engine was last completed up through the controller obtaining the initial valve position of the valve.

3. The method of claim 2, wherein the controller predicting engine emission maintenance based on the initial valve position of the valve of the EGR valve component includes comparing the rate of change of the initial valve position to a rate of change threshold.

4. The method of claim 3, wherein the rate of change threshold is determined based on at least one of engine simulation testing, engine bench testing, and field testing.

5. The method of claim 1, wherein the controller predicting engine emission maintenance based on the initial valve position of the valve of the EGR valve component includes comparing the initial valve position of the valve of the EGR valve component to a valve position threshold.

6. The method of claim 5, wherein the valve position threshold is determined based on at least one of engine simulation testing, engine bench testing, and field testing.

7. The method of claim 1, wherein the controller providing the advanced notification warning based on whether the controller predicts engine emission maintenance includes providing notification of emissions maintenance prior to the common rail diesel engine failing emissions standards and/or requirements.

8. The method of claim 1, wherein the controller providing the advanced notification warning based on whether the controller predicts engine emission maintenance includes providing at least one of: a display notification on the TRU or GenSet; a short message service (SMS) notification to a user; and an email notification to the user.

9. The method of claim 1, further comprising an actuator of the EGR valve component sending the initial valve position of the valve of the EGR valve component to the controller.

10. An emission reduction system for a common rail diesel engine comprising:
an exhaust gas recirculation (EGR) valve component reducing emissions of the common rail diesel engine, the EGR valve component including a valve and a seat;
a sensor configured to monitor an initial valve position of the valve of the EGR valve component with respect to the seat of the EGR valve component upon startup of a transport refrigeration unit (TRU) or a TRU generator set (GenSet); and
a controller programmed to receive the initial valve position, programmed to predict engine emission maintenance based on the initial valve position, and programmed to generate and provide an advanced notification warning to a user when the controller predicts engine emission maintenance.

11. The emission reduction system of claim 10, wherein the controller is programmed to evaluate a rate of change of the initial valve position of the valve of the EGR valve component over a time period from when maintenance and/or cleaning of the common rail diesel engine was last completed up through the controller obtaining the initial valve position of the valve.

12. The emission reduction system of claim 11, wherein the controller is programmed to predict engine emission maintenance based on the initial valve position of the valve of the EGR valve component includes the controller being programmed to compare the rate of change of the initial valve position to a rate of change threshold.

13. The emission reduction system of claim 12, wherein the rate of change threshold is based on at least one of engine simulation testing, engine bench testing, and field testing.

14. The emission reduction system of claim 10, wherein the controller is programmed to predict engine emission maintenance based on the initial valve position of the valve of the EGR valve component includes the controller being programmed to compare the initial valve position of the valve of the EGR valve component to a valve position threshold.

15. The emission reduction system of claim 14, wherein the valve position threshold is based on at least one of engine simulation testing, engine bench testing, and field testing.

16. The emission reduction system of claim 10, wherein the controller is programmed to provide the advanced notification warning based on whether the controller predicts engine emission maintenance includes the controller being programmed to provide notification of emissions maintenance prior to the common rail diesel engine failing emissions standards and/or requirements.

17. The emission reduction system of claim 10, wherein the controller is programmed to provide the advanced notification warning based on whether the controller predicts engine emission maintenance includes the controller being programmed to provide at least one of: a display notification on the TRU or GenSet; a short message service (SMS) notification to a user; and an email notification to the user.

18. The emission reduction system of claim 10, wherein the EGR valve component includes an actuator, the actuator configured to send the initial valve position of the valve of the EGR valve component to the controller.

* * * * *